United States Patent Office 3,435,082
Patented Mar. 25, 1969

3,435,082
PREPARATION OF FLUOROCARBONS BY REACTING CARBON TETRACHLORIDE OR HEXACHLOROETHANE WITH CARBONYL FLUORIDE
John W. Ager, Jr., Princeton, N.J., assignor to FMC Corporation, New York, N.Y., a corporation of Delaware
No Drawing. Filed Nov. 22, 1965, Ser. No. 509,181
Int. Cl. C07c *17/24, 17/20*
U.S. Cl. 260—653.8       4 Claims

ABSTRACT OF THE DISCLOSURE

Fluorocarbons of 1 to 2 carbon atoms are prepared by heating carbon tetrachloride or hexachloroethane with carbonyl fluoride, preferably in the presence of a chloride of aluminum, tungsten, molybdenum or tantalum.

---

This invention relates to the preparation of fluorocarbons and more particularly to the reaction of carbon tetrachloride or hexachloroethane with carbonyl fluide.

At present fluorocarbons such as trichlorofluoromethane, dichlorodifluoromethane, chlorotrifluoromethane, carbon tetrafluoride, dichlorodifluoromethane and tetrachlorodifluoroethane are prepared by reacting carbon tetrachloride or hexachloroethane with hydrogen fluoride. Many alternative processes have been investigated but no process has been found which is competitive with the present commercial process. In U.S. Patent No. 3,069,481 and in the Journal of the American Chemical Society, vol. 79, p. 5801, Haszeldine et al. teach the reaction of phosgene and carbonyl fluoride at 425° C. in the presence of activated carbon impregnated with ferric chloride. The reported yield of fluorocarbon was limited to 7% dichlorodifluoromethane. It is an object of this invention to provide an alternative method of producing fluorocarbons in good yield.

It has now been discovered that fluorocarbons can be produced in good yield by reacting carbon tetrachloride or hexachloroethane with carbonyl fluoride at a temperature of 100–400° C. Quite surprisingly this reaction takes place in good yield under rather mild conditions. Substantially quantitative conversions and yields of the order of 95–100% can be obtained in the presence of certain catalysts.

When carbon tetrachloride is reacted with carbonyl fluoride at 100–400° C., the product is a mixture containing various proportions of trichlorofluoromethane, dichlorodifluoromethane, chlorotrifluoromethane and carbon tetrafluoride. The proportion of each of these products will depend upon the specific reaction conditions employed, particularly the temperature and catalyst. The reaction of hexachloroethane with carbonyl fluoride produces tetrachlorodifluoroethane and pentachlorofluoroethane. Small amounts of fluorinated methanes may also be obtained.

Useful results are obtained in accordance with this invention when the mole ratio of carbon tetrachloride or hexachloroethane to carbonyl fluoride is about 10:1 to 1:2. Preferably this ratio should be about 5:1 to 1:1 which promotes the production of the more desirable lower fluorinated products.

Although the novel reactions of this invention can be carried out in the absence of catalyst, substantially improved conversions and fluorocarbon yields are obtained in the presence of certain catalysts. Suitable catalysts which have been found to have a favorable influence upon the reactions of this invention include tungsten hexachloride, aluminum chloride, molybdenum pentachloride, tantalum pentachloride and mixtures thereof. In general these catalysts considerably improve the conversion of carbonyl fluoride to fluorocarbons while reducing the production of COClF.

The use of aluminum chloride alone gives about 100% conversions of carbonyl fluoride but produces a major amount of highly fluorinated products such as chlorotrifluoromethane and tetrafluoromethane rather than the more desirable trichlorofluoromethane and dichlorodifluoromethane. On the other hand, tungsten hexachloride gives somewhat lower conversions but better yields of trichlorofluoromethane and dichlorodifluoromethane. Particularly preferred catalysts are those containing aluminum chloride in combination with tungsten hexachloride, tantalum pentafluoride or niobium pentachloride which give substantially quantitative yields of fluorocarbons including up to about 85% trichlorofluoromethane and dichlorodifluoromethane.

Although aluminum may be added to the reaction as aluminum chloride, it is believed that the active catalyst is a mixed halide such as $AlClF_2$ which results from partial conversion of aluminum chloride to auminum fluoride under the conditions of the reaction. Athough "aluminum chloride" is recited in the claims, it is intended to cover the active catalyst formed from aluminum chloride under the reaction conditions.

Temperature has been found to have a substantial influence upon the reactions of this invention. Temperatures of at least about 100° C. are required to promote the reaction. Temperatures of about 200° C. most favorably influence the reaction in that carbonyl fluoride conversions are high and a greater proportion of the less fluorinated products are obtained. At 300° C. conversions are still high, but a larger proportion of the higher fluorinated products are obtained. However, satisfactory results are obtained at temperatures up to about 400° C. Reaction times of the order of about 15 minutes are required.

The pressure used in the process of this invention is of relatively little significance and thus can be varied over wide limits. The most important consideration with respect to pressure is to choose a pressure which allows the reaction to be carried out in a continuous manner and simplifies recovery of the products and any volatilized catalyst. Pressures in the range of about 0–1000 p.s.i.g. have been found to be suitable. Very high carbonyl fluoride conversions have been obtained at pressures of 200–500 p.s.i.g.

The following examples, illustrating the novel processes of this invention, are given without any intention that the invention be limited thereto. All parts and percentages are by weight.

EXAMPLE 1

A mixture of 10 parts of $CCl_4$ and 5.5 parts of $COF_2$ was heated in a bomb at 300° C. for 15 minutes. The pressure in the bomb was estimated to be about 500 p.s.i.g. A sample of the product was removed for mass spectrographic analysis and found to contain:

|  | Parts |
|---|---|
| $CCl_4$ | 4.0 |
| $COCl_2$ | 2.0 |
| $CCl_3F$ | 2.8 |
| $COF_2$ | 3.9 |
| $COClF$ | 1.3 |

This analysis indicates a 29% conversion of $COF_2$ and a 41% yield of $CCl_3F$ based on the $COF_2$ conversion.

EXAMPLE 2

A mixture of 10 parts of $CCl_4$, 6 parts of $COF_2$ and 6 parts of $WCl_6$ was heated at 300–330° C. for 15 minutes.

The reaction mixture was sampled and analyzed by mass spectrography. The product contained:

| | Parts |
|---|---|
| $CCl_4$ | 3.4 |
| $COCl_2$ | 5.5 |
| $CO_2$ | 0.5 |
| $COF_2$ | 1.2 |
| $COClF$ | 1.2 |
| $CCl_3F$ | 5.5 |
| $CCl_2F_2$ | 0.7 |

These figures indicate a 66% conversion of $COF_2$, but only 57% of the fluorine was accounted for. Also, the weight of the bomb, after reaction, indicated that practically all of the tungsten catalyst was removed with the volatile products, presumably as $WF_6$. The yield of $CCl_3F$ and $CCl_2F_2$ was 31% and 9%, respectively, based on the conversion.

EXAMPLE 3

A mixture of 10 parts of $CCl_4$, 5 parts of $COF_2$ and 6 parts of $AlCl_3$ was heated at 300° C. for 15 minutes. All the fluorine went to convert the $AlCl_3$ to aluminum chlorofluoride. The catalyst lost 2.5 parts by weight during the heating.

The preconditioned aluminum halide catalyst was heated with 10 parts of $CCl_4$ and 5 parts of $COF_2$ to 300° C. for 15 minutes. Mass spectrographic analysis of the product medium indicated that it contained:

| | Parts |
|---|---|
| $CCl_4$ | 1.4 |
| $COCl_2$ | 6.5 |
| $COClF$ | 0.5 |
| $CCl_3F$ | 0.6 |
| $CCl_2F_2$ | 1.1 |
| $CClF_3 + CF_4$ | 4.2 |

There was a 100% conversion of $COF_2$, a 3% yield of $CCl_3F$, a 12% yield of $CCl_2F_2$ and an 85% yield of $CClF_3 + CF_4$.

EXAMPLE 4

To the bomb containing the catalyst from Example 3 were added 3 parts of $WCl_6$, 10 parts of $CCl_4$ and 5.5 parts of $COF_2$. The mixture was heated at 300° C. for 15 minutes. Mass spectrographic analysis of the product indicated that it contained:

| | Parts |
|---|---|
| $CCl_4$ | 1.4 |
| $COCl_2$ | 6.6 |
| $COF_2$ | 2.0 |
| $CCl_3F$ | 1.4 |
| $CCl_2F_2$ | 5.7 |
| $CClF_3$ | 1.0 |
| $CF_4$ | 0.4 |

There was a 95% conversion of $COF_2$, a 6% yield of $CCl_3F$, a 58% yield of $CCl_2F_2$, a 17% yield of $CClF_3$ and a 13% yield of $CF_4$.

EXAMPLE 5

A mixture of 6 parts of $AlCl_3$, 3 parts of $WCl_6$, 10 parts of $CCl_4$ and 5.5 parts of $COF_2$ was heated at 200° C. for 15 minutes to precondition the $AlCl_3$. The volatile products were pumped off and the treated catalyst used with 10 parts of $CCl_4$ and 5.5 parts of $COF_2$. The mixture was heated at 200° C. for 15 minutes. Mass spectrographic analysis of the product indicated that it contained:

| | Parts |
|---|---|
| $CCl_4$ | 1.7 |
| $COCl_2$ | 3.5 |
| $COF_2$ | 1.8 |
| $COClF$ | 2.0 |
| $CCl_3F$ | 4.1 |
| $CCl_2F_2$ | 2.9 |

There was a 77% conversion of $COF_2$, a 23% yield of $CCl_3F$ and a 37% yield of $CCl_2F_2$.

EXAMPLE 6

A mixture of 6 parts of $AlCl_3$, 10 parts of $CCl_4$ and 4.6 parts of $COF_2$ was heated at 300° C. for 15 minutes to convert the $AlCl_3$ to the active fluoride compound. The volatile products of the reaction were discarded and 3 parts of $TaF_5$, 10 parts of $CCl_4$ and 5 parts $COF_2$ were added to the bomb which was then heated at 300° C. for 15 minutes. Mass spectrographic analysis of the product showed a 95% conversion of $COF_2$, a 6% yield of $CCl_3F$, a 74% yield of $CCl_2F_2$, and an 11% yield of $$CClF_3 + CF_4$$

based on the conversion.

EXAMPLE 7

To the catalyst in the bomb from Example 6 were added 3.8 parts of $NbCl_5$, 10 parts of $CCl_4$ and 5.5 parts of $COF_2$. The mixture was heated at 300° C. for 15 minutes. Mass spectrographic analysis indicated that the products were 27% $CCl_3F$, 60% $CF_2Cl_2$, and 26%

$$CClF_3 + CF_4$$

The conversion of $COF_2$ was 95%.

EXAMPLE 8

A mixture of 3 parts of $TaCl_5$, 10 parts of $CCl_4$ and 5.5 parts of $COF_2$ was heated in a bomb for 15 minutes at 300° C. Mass spectrographic analysis indicated that the products were 3% $CCl_3F$, 70% $CCl_2F_2$, 14%

$$CClF_3 + CF_4$$

and 14% $COClF$. The conversion of $COF_2$ was 85%.

EXAMPLE 9

A preconditiloned $AlCl_3$–$WCl_6$ catalyst in a bomb was heated at 300° C. for 15 minutes with hexachloroethane. The products were $COFCl$, $CCl_2F_2$, $CCl_3F$, $CF_4$, $C_2Cl_4F_2$ and $C_2Cl_3F_3$.

As will be apparent to those skilled in the art numerous modifications and variations of the process of this invention may be made without departing from the spirit of the invention or the scope of the following claims.

What is claimed is:

1. A method for the preparation of fluorocarbons having 1 to 2 carbon atoms comprising reacting carbon tetrachloride or hexachloroethane with carbonyl fluoride at a temperature of 100–400° C. wherein the ratio of carbon tetrachloride or hexachloroethane to carbonyl fluoride is 10:1 to 1:2.

2. The method of claim 1 in which the reaction is carried out in the presence of a catalyst selected from the group consisting of tungsten hexachloride, aluminum chloride, molybdenum pentachloride, tantalum pentachloride and mixtures thereof.

3. The method of claim 2 in which carbon tetrachloride is reacted at 150–300° C. in the presence of aluminum chloride in combination with tungsten hexachloride, tantalum pentafluoride or niobium pentachloride.

4. The method of claim 3 in which the ratio of carbon tetrachloride to carbonyl fluoride is 5:1 to 1:1.

References Cited

UNITED STATES PATENTS 2,739,989   3/1956   Barringer et al. _____ 260–653.8

OTHER REFERENCES

Miller: J. Am. Chem. Soc. 62, 341–344 (1940).
Fawcett et al.: Am. Chem. Soc. 84, 4275–4285 (1962).

DANIEL D. HORWITZ, Primary Examiner.

U.S. Cl. X.R.

252—441, 442